(12) United States Patent
Downs et al.

(10) Patent No.: US 10,487,890 B2
(45) Date of Patent: *Nov. 26, 2019

(54) DUAL PISTON ACTUATOR

(71) Applicant: American Axle & Manufacturing, Inc., Detroit, MI (US)

(72) Inventors: James P. Downs, South Lyon, MI (US); Paul J. Valente, Berkley, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 463 days.

This patent is subject to a terminal disclaimer.

(21) Appl. No.: 15/344,660

(22) Filed: Nov. 7, 2016

(65) Prior Publication Data

US 2017/0051796 A1 Feb. 23, 2017

Related U.S. Application Data

(63) Continuation of application No. 14/516,026, filed on Oct. 16, 2014, now Pat. No. 9,512,888.

(51) Int. Cl.
*F16D 48/02* (2006.01)
*F16D 48/06* (2006.01)
(Continued)

(52) U.S. Cl.
CPC ............ *F16D 48/02* (2013.01); *F16D 25/083* (2013.01); *F16D 29/005* (2013.01); *F16D 48/06* (2013.01);
(Continued)

(58) Field of Classification Search
CPC .. F16D 25/06; F16D 2025/081; F16D 25/083; F16D 25/10; F16D 29/00;
(Continued)

(56) References Cited

U.S. PATENT DOCUMENTS 1,970,999 A 8/1934 Ferris et al.
2,843,976 A 7/1958 Silver
(Continued)

FOREIGN PATENT DOCUMENTS

CN 1125974 A 7/1996
DE 4237852 A1 5/1994
(Continued)

OTHER PUBLICATIONS

Chinese Office Action dated Aug. 15, 2017.

*Primary Examiner* — Richard M Lorence
(74) *Attorney, Agent, or Firm* — Harness, Dickey & Pierce, P.L.C.

(57) ABSTRACT

An actuator assembly can include a housing, first and second pistons, and spring. The housing can include first and second cylinders disposed about an axis. The first piston and cylinder can define a first chamber in fluid communication with an inlet. The second piston and cylinder can define a second chamber in fluid communication with an outlet. Opposite ends of the spring can be coupled for axial translation with the first and second piston, respectively. The spring can translate the first piston to provide high volume, low pressure fluid to the outlet when a pressure in the first chamber is less than a predetermined pressure. When the pressure in the first chamber is equal to, or greater than, the predetermined pressure and the second piston is translated in the first axial direction, the spring can compress and the second piston can provide low volume, high pressure fluid to the outlet.

20 Claims, 5 Drawing Sheets

(51) Int. Cl.
    *F16D 29/00*         (2006.01)
    *F16D 25/08*         (2006.01)
    *F16D 121/04*       (2012.01)

(52) U.S. Cl.
    CPC ............... *F16D 2025/081* (2013.01); *F16D 2048/0212* (2013.01); *F16D 2121/04* (2013.01)

(58) Field of Classification Search
    CPC .... F16D 29/005; F16D 48/02; F16D 48/0206; F16D 2048/0212; F16D 2048/0251; F16D 48/06; F16D 48/066; F16D 2121/04; F15B 7/08
    See application file for complete search history.

(56) References Cited

U.S. PATENT DOCUMENTS

| | | | |
|---|---|---|---|
| 5,261,810 A | | 11/1993 | Kamp et al. |
| 5,398,780 A | | 3/1995 | Althof et al. |
| 6,595,338 B2 | | 7/2003 | Bansbach et al. |
| 7,178,654 B2 | | 2/2007 | Ronk et al. |
| 7,182,194 B2 | | 2/2007 | Ronk et al. |
| 9,512,888 B2 | * | 12/2016 | Downs ................. F16D 29/005 |
| 2005/0189190 A1 | | 9/2005 | Kowalsky et al. |
| 2006/0042906 A1 | | 3/2006 | Ronk et al. |

FOREIGN PATENT DOCUMENTS

| | | |
|---|---|---|
| FR | 2990256 A1 | 11/2013 |
| GB | 348691 A | 5/1931 |
| GB | 2123503 A | 2/1984 |

* cited by examiner

DUAL PISTON ACTUATOR

CROSS-REFERENCE TO RELATED APPLICATIONS

This application is a continuation of U.S. patent application Ser. No. 14/516,026 filed on Oct. 16, 2014. The entire disclosure of the above application is incorporated herein by reference.

FIELD

The present disclosure relates to a dual piston actuator for a disconnectable vehicle driveline.

BACKGROUND

This section provides background information related to the present disclosure which is not necessarily prior art.

Hydraulically operated clutches generally include a piston which applies force to the clutch system to engage the clutch plates. In order to have low parasitic drag when the clutch is open, there needs to be clearance between the plates, which rotate relative to one another. Since there are often many plates in a clutch, this means that the overall axial space in a clutch can be substantial. Thus, for the clutch plates to reach maximum separation for low drag torque, the piston must retract a considerable distance from the point of engagement. Typically, for the piston to move from the fully retracted position to engage the clutch plates, the piston must first take up all of this distance before the clutch will start transmitting a usable amount of torque. In order for the piston to take up this distance quickly, a high flow of hydraulic fluid to the piston is required during the initial actuation. As the clutch plates are not engaged during this initial movement of the piston, the fluid can be provided at a lower pressure. Once the clutch plates begin to engage, the piston has less distance to travel before the clutch is fully engaged, thus the high flow rate is no longer needed. Instead, a higher pressure is required to force the clutch plates into complete engagement. These two requirements are diametrically opposed to each other when designing a hydraulic actuation system. The present invention pertains to an actuator of such a hydraulic system that is capable of both rapid take-up and high pressures.

SUMMARY

This section provides a general summary of the disclosure, and is not a comprehensive disclosure of its full scope or all of its features.

The present teachings provide for an actuator assembly including a first piston, a first cylinder, a second piston, a second cylinder, a valve body and a linear actuator. The first piston can be received in the first cylinder. The first piston and the first cylinder can define a first chamber. The first cylinder can define an inlet in fluid communication with the first chamber. The second piston can be received in the second cylinder. The second piston and the second cylinder can define a second chamber. The second cylinder can define an outlet in fluid communication with the second chamber. The second piston can define a fluid passage configured to permit fluid communication between the first and second chambers. The valve body can be movable between a first valve position and a second valve position. In the first valve position, the fluid passage can be open to permit fluid communication between the first and second chambers. In the second valve position, the valve body can block the fluid passage to prevent fluid communication between the first and second chambers. The linear actuator can axially translate the second piston and can axially translate the first piston when a pressure in the first chamber is less than a predetermined pressure. The linear actuator can be configured to not translate the first piston when the pressure in the first chamber is equal to, or greater than, the predetermined pressure. The valve body can be prevented from moving to the second valve position and the first piston can provide a first volume of fluid at a first pressure to the outlet when the drive mechanism translates the first piston in a first axial direction. The valve body can be permitted to move to the second valve position when the pressure in the first chamber is equal to, or greater than the predetermined pressure and the second piston is translated in the first axial direction. The second piston can provide a second volume of fluid at a second pressure to the outlet when the valve body is in the second valve position and the second piston is translated in the first axial direction. The first volume of fluid can be greater than the second volume of fluid and the first pressure can be less than the second pressure.

The present teachings provide for an actuator assembly including a housing, a first piston, a second piston, and a resilient member. The housing can include a first cylinder and a second cylinder disposed about an axis. The housing can define an inlet and an outlet. The first piston can be received in the first cylinder. The first piston and the first cylinder can define a first fluid chamber in fluid communication with the inlet. The second piston can be received in the second cylinder. The second piston and the second cylinder can define a second fluid chamber in fluid communication with the outlet. The resilient member can have a first end coupled for axial translation with the second piston and a second end coupled for axial translation with the first piston. The resilient member can translate the first piston to provide a first volume of fluid at a first pressure from the first chamber to the outlet when a pressure in the first chamber is less than a predetermined pressure and the second piston is translated in the second cylinder in a first axial direction. The resilient member can compress between the first and second pistons to permit relative axial motion between the first and second pistons when the pressure in the first chamber is equal to, or greater than, the predetermined pressure and the second piston is translated in the first axial direction. The second piston can provide a second volume of fluid at a second pressure from the second chamber to the outlet when the pressure in the first chamber is equal to, or greater than, the predetermined pressure and the second piston is translated in the first axial direction. The first volume of fluid can be greater than the second volume of fluid, and the first pressure can be less than the second pressure.

The present teachings provide for an actuator assembly including a housing, a first piston, a second piston, a spring, and a valve. The housing can include a first cylinder disposed about an axis and a second cylinder coaxial with the first cylinder. The housing can define an inlet and an outlet. The first piston can be received in the first cylinder. The first piston and the first cylinder can define a first fluid chamber in fluid communication with the inlet. The second piston can be received in the second cylinder. The second piston and the second cylinder can define a second fluid chamber in fluid communication with the outlet. The spring can have a first end coupled for axial translation with the second piston and a second end coupled for axial translation with the first piston. The valve can have a fluid passage and a valve body. The fluid passage can fluidly couple the first and second chambers. The valve body can be movable relative to the fluid passage between a first valve position and a second valve position. In the first valve position, the fluid passage can be open to permit fluid communication between the first and second chambers. In the second valve position, the valve body can block the valve passage to prevent fluid communication between the first and second chambers. The spring can be configured to axially translate the first piston in a first axial direction when the second piston is translated in the first axial direction and a pressure in the first chamber is less than a predetermined pressure. The spring can be configured to compress between the first and second pistons to allow relative axial movement of the first and second pistons between a first relative position and a second relative position when the second piston is translated in the first axial direction and the pressure in the first chamber is equal to, or greater than, the predetermined pressure. The first piston can engage the valve body to prevent the valve body from moving to the second valve position when the first and second pistons are in the first relative position. The valve body can be permitted to move to the second valve position when the first and second pistons are in the second relative position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
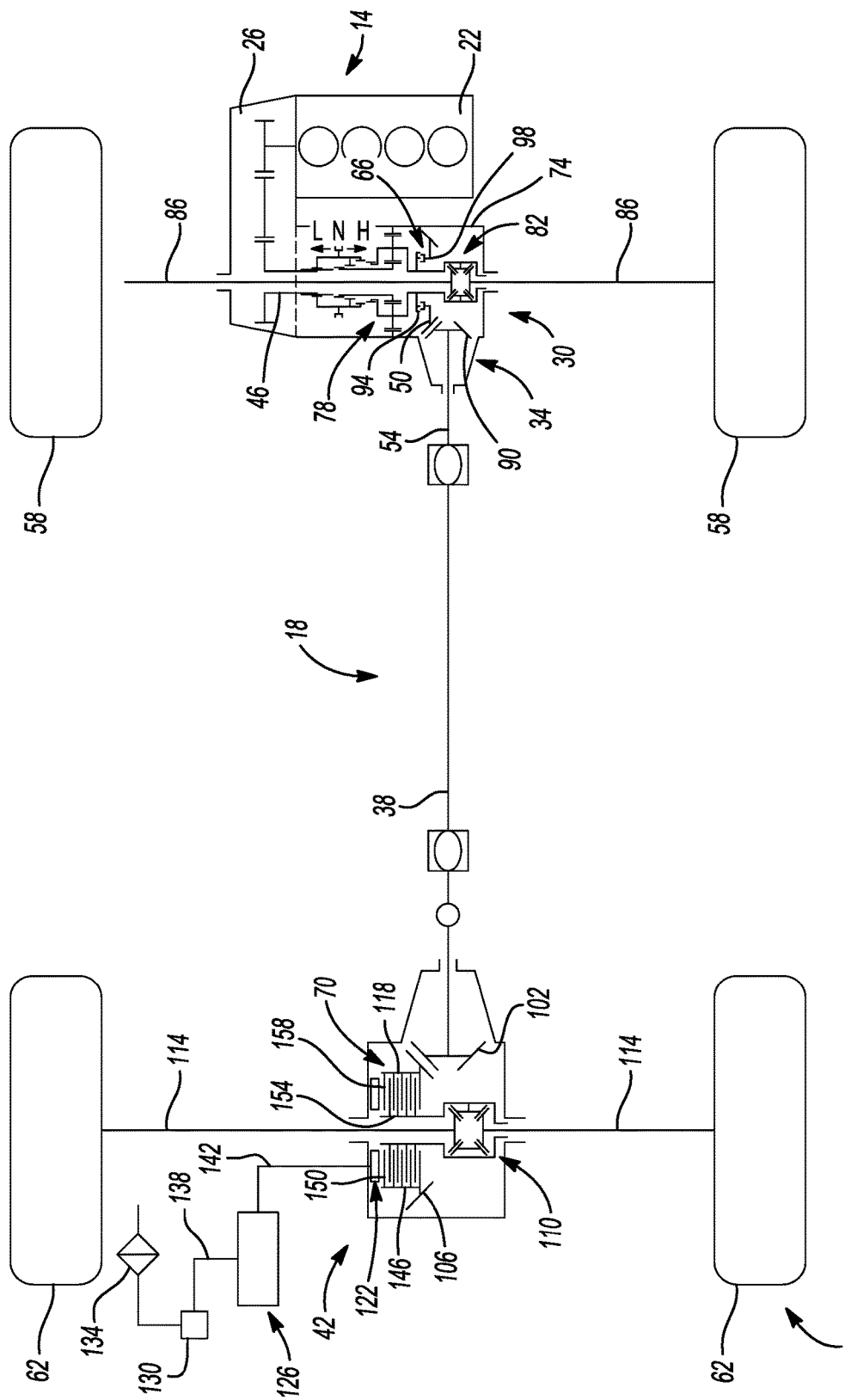
FIG. 1 is an exemplary vehicle having a power transmitting component constructed in accordance with the present teachings.

With reference to FIG. 1 of the drawings, an exemplary vehicle having clutches that can be actuated by a power transmitting component constructed in accordance with the teachings of the present disclosure is generally indicated by reference numeral 10. The vehicle 10 can have a power train 14 and a drive line or drive train 18. The power train 14 can be conventionally constructed and can comprise a power source 22 and a transmission 26. The power source 22 can be configured to provide propulsive power and can comprise an internal combustion engine and/or an electric motor, for example. The transmission 26 can receive propulsive power from the power source 22 and can output power to the drive train 18. The transmission 26 can have a plurality of automatically or manually-selected gear ratios. The drive train 18 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations, for example.

The drive train 18 can include a front axle assembly 30, a power take-off unit (PTU) 34, a prop shaft 38 and a rear axle assembly 42. An output of the transmission 26 can be coupled to an input of the front axle assembly 30 to drive an input member 46 of the front axle assembly 30. The PTU 34 can have a PTU input member 50, which can receive rotary power from the input member 46 of the front axle assembly 30, and a PTU output member 54 that can transmit rotary power to the prop shaft 38. The prop shaft 38 can couple the PTU output member 54 to the rear axle assembly 42 such that rotary power output by the PTU 34 is received by the rear axle assembly 42. The front axle assembly 30 and the rear axle assembly 42 could be driven on a full-time basis to drive front and rear vehicle wheels 58 and 62, respectively. It will be appreciated, however, that the drive train 18 could include one or more clutches to interrupt the transmission of rotary power through a part of the drive train 18. In the particular example provided, the drive train 18 include a first clutch 66, which can be configured to interrupt the transmission of rotary power into or through the PTU 34, and a power transmitting component 70, which can be configured to control rotation of components within the rear axle assembly 42.

The front axle assembly 30, the PTU 34 and the first clutch 66 can be mounted in a housing assembly 74. The front axle assembly 30 can include the input member 46, a two-speed transmission 78, a front differential assembly 82 and a pair of front axle shafts 86. The input member 46 can be a hollow shaft that can be configured to engage with the output member of the transmission 26. The input member 46 can be configured to engage with the two-speed transmission 78. The two-speed transmission 78 can be configured to engage the first clutch 66 and the front differential assembly 82.

The front differential assembly 82 can be coupled to the front axle shafts 86 and permit speed differentiation between the front axle shafts 86. In the example provided, the front differential assembly 82 is an open differential. It will be appreciated, however that other speed differentiation means could be employed in the alternative, such as one or more clutches, a locking differential or a limited slip differential.

The PTU 34 can include the PTU input member 50, a pinion gear 90 and the PTU output member 54. The PTU input member 50 can comprise a bevel ring gear that is mounted in the housing assembly. The pinion gear 90 can be meshingly engaged to the bevel ring gear of the PTU input member 50 and can be aligned along an axis that is generally perpendicular to the rotational axis of the input member 46. If desired, the pinion gear 90 can be a hypoid pinion gear. The PTU output member 54 can be coupled to the pinion gear 90 for rotation therewith.

The first or mode clutch 66 can be any type of clutch, including a friction clutch or a synchronizer. In the particular example provided, the mode clutch 66 is a dog clutch having a clutch input member 94 and a clutch output member 98. The clutch input member 94 can be coupled to the two-speed transmission 78 for rotation therewith. The clutch output member 98 can be non-rotatably coupled to the bevel ring gear of the PTU input member 50. The mode clutch 66 can be operable for selectively transmitting rotary power between the clutch input member 94 and the clutch output member 98.

The rear axle assembly 42 can include an input pinion 102, a bevel ring gear 106, a second differential assembly 110, a pair of second shafts 114, and the power transmitting component 70. The input pinion 102 can be coupled to an end of the propshaft 38 for rotation therewith. The second bevel ring gear 106 being meshed with the input pinion 102. The second differential assembly 110 can be configured to receive rotary power transmitted through the second bevel ring gear 106 and to transmit that rotary power to the second shafts 114. The second differential assembly 110 can have a means for permitting speed differentiation between the second shafts 114. In the example provided, the speed differentiation means comprises an open differential.

The power transmitting component 70 can include a second clutch 118, a ram 122, and a hydraulic actuator 126. The power transmitting component 70 can further include a fluid reservoir 130 and a vent 134. The reservoir 130 can be configured to hold a hydraulic fluid and the vent 134 can vent to atmosphere, or can be configured to selectively vent to atmosphere based on a predetermined pressure of the reservoir 130. The reservoir 130 and hydraulic actuator 126 can be fluidly coupled by hydraulic conduit 138. The hydraulic actuator 126 and ram 122 can be fluidly coupled by hydraulic conduit 142. The second clutch or axle disconnect clutch 118 of the power transmitting component 70 can be configured to selectively interrupt power transmission through the second differential assembly 110. The axle disconnect clutch 118 can be any type of clutch and can be mounted coaxially with the second differential assembly 110. In the particular example provided, the axle disconnect clutch 118 includes a clutch input member 146 that is coupled to the bevel ring gear 106 for rotation therewith, a plurality of first friction plates 150 that are non-rotatably coupled to the clutch input member 146, a clutch output member 154, which is coupled to the second differential assembly 110 to provide rotary power thereto, and a plurality of second friction plates 158, which are non-rotatably coupled to the clutch output member 154. The first and second friction plates 150 and 158 can be interleaved and the ram 122 can be employed to compress the first and second friction plates 150 and 158 so that they frictionally engage one another so that rotary power can be transmitted from the bevel ring gear 106 through the axle disconnect clutch 118 and to the second differential assembly 110. When the ram 122 is disengaged so that rotary power is not transmitted through the axle disconnect clutch 118, the rear wheels 62 will drive the second shafts 114, but the axle disconnect clutch 118 inhibits the transmission of rotary power into the bevel ring gear 106. In this way, operation of the vehicle 10 in a front-wheel drive mode will not permit the rear wheels 62 to "back drive" the bevel ring gear 106.

With reference to FIGS. 2-5 of the drawings, the power transmitting component 70 is illustrated in more detail. The power transmitting component 70 can further include a valve 210 disposed inline with conduit 138, between the reservoir 130 and the hydraulic actuator 126. The ram 122 can include a ram piston 214, an apply plate 218, and a ram housing 222 defining a ram chamber 226. The ram 122 can be selectively operated to move the apply plate 218 between a first ram position, in which the first and second friction plates 150, 158 are disengaged from one another so that rotary power is not transmitted between the clutch input member 146 and the clutch output member 154, and a second ram position in which the first and second friction plates 150, 158 are frictionally engaged to one another to transmit rotary power from the clutch input member 146 to the clutch output member 154. The present teachings also allow for minimizing frictional drag by allowing greater separation of friction plates 150, 158 than typical rams.

In the example provided, the ram piston 214 is an annular piston and the ram chamber 226 is an annular chamber, though it will be appreciated that other configurations can be used. The ram piston 214 can be movable within the ram chamber 226 and coupled to the apply plate 218 such that when the apply plate 218 is in the first ram position, the ram piston 214 is retracted relative to the first and second friction plates 150, 158, and when the apply plate 218 is in the second ram position, the ram piston 214 is extended relative to the first and second friction plates 150, 158. The ram housing 222 can have a ram port 230 for receiving hydraulic fluid into the ram chamber 226 on a first side 234 of the ram piston 214. Inputting fluid to the ram chamber 226 on the first side 234 of the ram piston 214 can cause the ram piston 214 to move from the retracted position to the extended position, to cause the apply plate 218 to move from the first ram position to the second ram position. Removal of fluid from the ram chamber 226 on the first side 234 of the ram piston 214 can cause the ram piston 214 to move from the extended position to the retracted position, to cause the apply plate 218 to move from the second ram position to the first ram position. The ram piston 214 can also be biased toward the retracted position by a biasing member (not shown), such as a spring for example. In this way, introduction and removal of fluid within the ram can move the ram piston 214 within the chamber to selectively engage and disengage the clutch 118.

The hydraulic actuator 126 can have an actuator housing 238, a first piston 242, a second piston 246, a valve body 250, and a drive mechanism (e.g., a linear actuator) 254. The actuator housing 238 can have a first end 258 and a second end 262, and can define a first chamber 266, a second chamber 270, and a first port 274. The housing can also define a second port 278, an intermediate chamber 282, and a drive cavity 286. The first port 274 can be proximate to the second end 262 and fluidly couple the second chamber 270 with the conduit 142, to fluidly couple the hydraulic actuator 126 with the ram 122. The second port 278 can be between the first and second ends 258, 262 and can fluidly couple the first chamber 266 with the conduit 138, to fluidly couple the hydraulic actuator 126 with the reservoir 130. The valve 210 can also be disposed inline with conduit 138, between the reservoir 130 and the second port 278. In the example provided, the valve 210 is a check valve, configured to allow fluid to flow between the reservoir 130 and the first chamber 266 when the first chamber 266 is not pressurized, and to prevent fluid from flowing between the reservoir 130 and the first chamber 266 when the first chamber 266 is pressurized.

The first and second chambers 266, 270 can be generally cylindrical in shape and can be co-axially disposed about an axis 290. The cross-sectional area of the first chamber 266 can be larger than the cross-sectional area of the second chamber 270. The second chamber 270 can be proximate to the second end 262, and the first chamber 266 can be axially between the second chamber 270 and the first end 258. The intermediate chamber 282 can be generally cylindrical in shape, can be co-axial with the first and second chambers 266, 270, and can be axially between the first and second chambers 266, 270. The cross-sectional area of the intermediate chamber 282 can be less than the cross-sectional area of the first chamber 266 and greater than the cross-sectional area of the second chamber 270. The drive cavity 286 can be co-axial with the first chamber 266 and axially between the first chamber 266 and the first end 258 of the actuator housing 238.

The first piston 242 can be received in the first chamber 266 and the second piston 246 can be received in the second chamber 270. The cross-sectional area of the first piston 242 can be greater than the cross-sectional area of the second piston 246, such that the first piston 242 has a greater displacement than the second piston 246. The second piston 246 can be generally cylindrical in shape and can have a driven end 294 and a compression end 298, opposite the driven end 294. The second piston 246 can also define a radial passage 302 and an axial bore 306 in fluid communication with the radial passage 302. The driven end 294 can be proximate to the first end 258 of the actuator housing 238, and can be coupled to the drive mechanism 254, as will be discussed below. The driven end 294 of the second piston 246 can extend within the first chamber 266. The compression end 298 can be proximate to the second end 262 of the actuator housing 238 and can extend into the second chamber 270. The compression end 298 can define a plug bore 310 having a seating surface 314 proximate to the second chamber 270 and in fluid communication with the axial bore 306 and the second chamber 270. An outer radial surface 318 of the second piston 246 can seal with an inner radial surface 322 of the second chamber 270. In the example provided, the seal is formed by an o-ring 326 received in an annular groove 330 in the second chamber 270, though other configurations or seals can be used. The radial passage 302 extends through the outer radial surface 318 of the second piston 246, between the driven end 294 and compression end 298. The axial bore 306 extends axially through the compression end 298 and intersects the radial passage 302 proximate to the driven end 294 and intersects the plug bore 310 proximate to the compression end 298, to allow fluid to pass between the first and second chambers 266, 270, through the second piston 246.

The first piston 242 can have a main body 334 and an extension member 338. The main body 334 can be generally annular shaped, having an outer radial surface 342 and defining a central bore 346 having an inner radial surface 350. The main body 334 can have a driven side 354, proximate to the first end 258 of the actuator housing 238, and a compression side 358, opposite the driven side 354 and in communication with the first chamber 266. The outer radial surface 342 of the main body 334 can seal with an inner radial surface 362 of the first chamber 266. In the example provided, the seal is formed by an o-ring 366 received in an annular groove 370 in the outer radial surface 342, though other configurations or seals can be used. The second piston 246 can be received through the central bore 346 of the first piston 242 and the outer radial surface 318 of the second piston 246 can seal with the inner radial surface 350 of the central bore 346. In the example provided, the seal is formed by an o-ring 374 received in an annular groove 378 in the inner radial surface 350, though other configurations or seals can be used. The extension member 338 can extend from the compression side 358 of the main body 334, toward the second end 262 of the actuator housing 238 to engage the valve body 250, as will be discussed below. In the example provided, the extension member 338 is a cylindrically shaped body extending axially from the main body 334 and slidable along the outer radial surface 318 of the second piston 246, though other configurations may be used.

The valve body 250 can include a radial member 382, an axial rod 386, and a plug 390. The axial rod 386 can be disposed within the axial bore 306 of the second piston 246 and can extend into the radial passage 302 proximate to the driven end 294, and can extend into the plug bore 310 proximate to the compression end 298. The axial rod 386 can have a diameter less than the diameter of the axial bore 306 to allow fluid to pass around the axial rod 386 and through the axial bore 306. The plug 390 can be coupled to the axial rod 386 proximate to the compression end 298 of the second piston 246. The plug 390 can be received within the plug bore 310 and can be larger than the axial bore 306. The plug 390 can be movable within the plug bore 310 and configured to mate with the seating surface 314, such that the plug 390 can block the flow of fluid through the axial bore 306 when engaged with the seating surface 314. The radial member 382 can be disposed within the radial passage 302, can be coupled to the axial rod 386, and can extend radially from the axial rod 386 through the radial passage 302. The radial member 382 can extend radially outward of the outer radial surface 318 of the second piston 246 and can engage the extension member 338 of the first piston 242. The radial member 382 can be configured to allow fluid to flow around the radial member 382 and through the radial passage 302. In the example provided, the radial member 382 is a rod, extending in the radial direction from the axial rod 386, though other configurations can be used.

The drive mechanism 254 can be any type of linear actuator configured to translate the second piston 246 axially, and can be at least partially disposed within the drive cavity 286. In the example provided, the drive mechanism 254 is a screw type actuator, though other configurations can be used. The drive mechanism 254 of the example provided can include a lead screw 394, a threaded body 398, a resilient member 402, a motor 406, and a gearbox 410. The lead screw 394 can be disposed about the axis 290 and have a plurality of external threads 414 configured to mate with a plurality of internal threads 418 formed in the threaded body 398. The threaded body 398 can be non-rotatable within the actuator housing 238 and coupled for linear motion with the second piston 246. In the present example, the second piston 246 is unitarily formed with the threaded body 398, though other configurations can be used. The threaded body 398 can have a shoulder 422, extending radially outward from the threaded body 398 and proximate to the first end 258 of the actuator housing 238. The resilient member 402 can be a coil spring disposed about the axis 290 and axially between the shoulder 422 and the driven side 354 of the first piston 242. A first end 426 of the resilient member 402 can be coupled to the shoulder 422 for axial movement therewith, and a second end 430 of the resilient member 402 can be coupled to the driven side 354 of the first piston 242 for axial movement therewith. The motor 406 can be received within the drive cavity 286 and configured to drive rotation of the lead screw 394 about the axis 290. The motor 406 can be any type of motor, such as a DC motor for example, and can have an output shaft (not shown). The gearbox 410 can have an input member (not shown), a plurality of reduction gears (not shown), and an output member 434. The output shaft can be coupled to the input member of the gearbox 410 to transmit rotational power through the plurality of gears, to the output member 434. The output member 434 can be coupled for rotation with the lead screw 394 to rotationally drive the lead screw 394.

Figure 2:
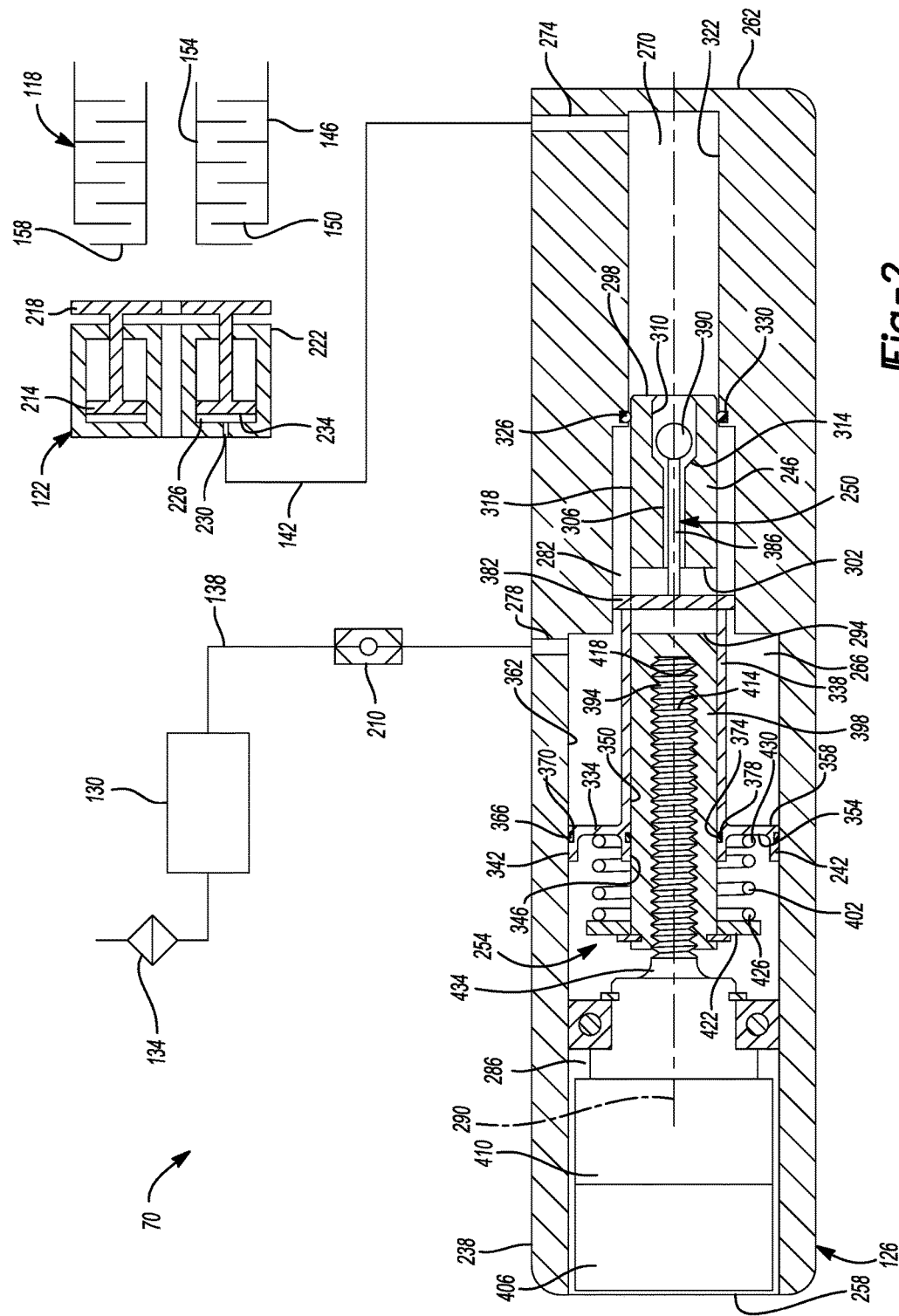
FIG. 2 is a section view of the power transmitting component of FIG. 1 in a first state.
Figure 3:
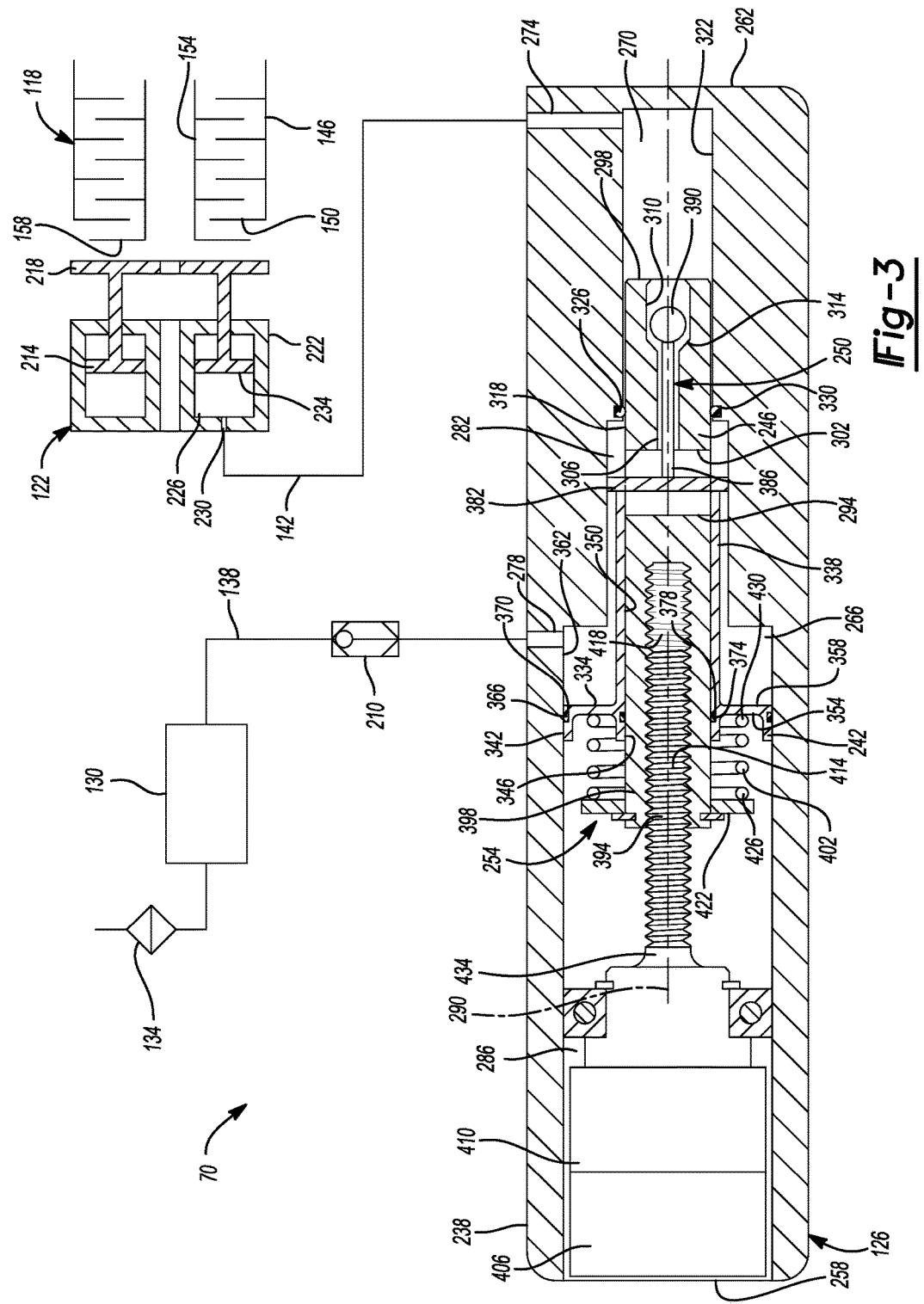
FIG. 3 is a section view of the power transmitting component of FIG. 1 in a second state.
Figure 4:
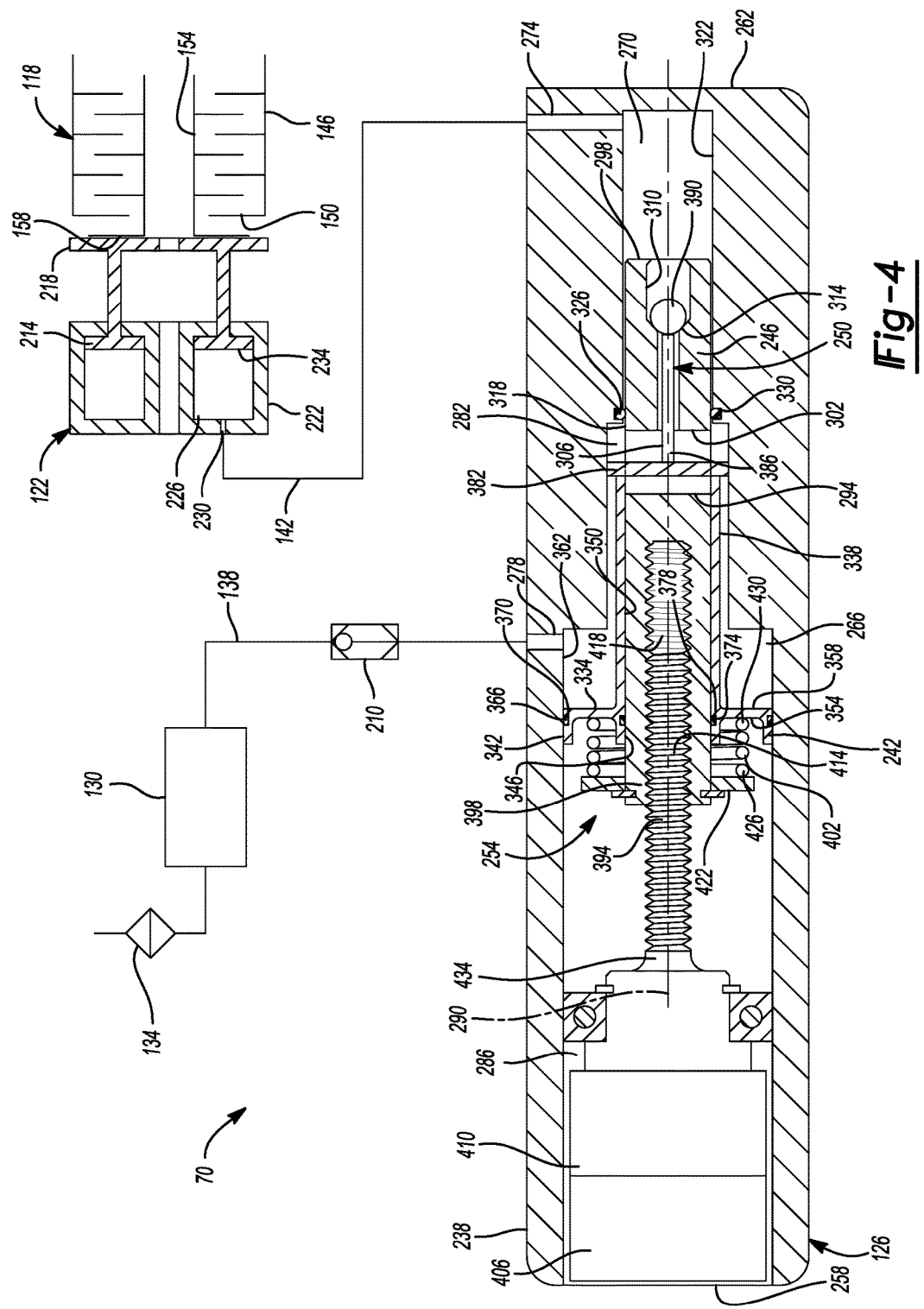
FIG. 4 is a section view of the power transmitting component of FIG. 1 in a third state.
Figure 5:
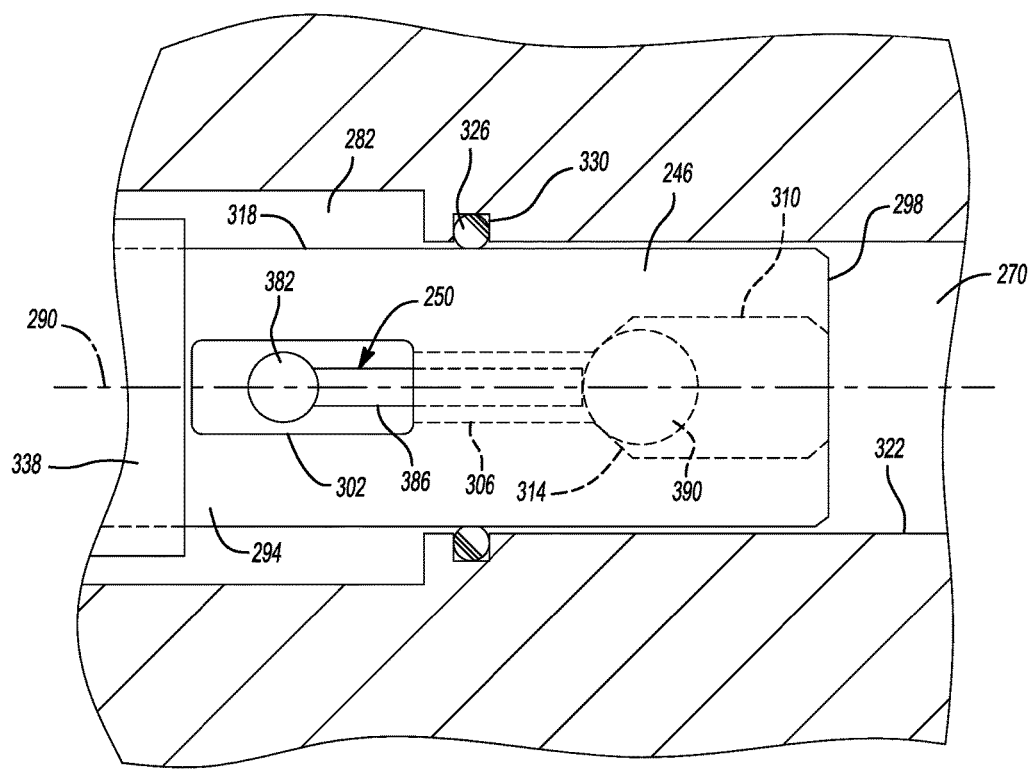
FIG. 5 is a detail view of a portion of the power transmitting component of FIG. 1.

The operation of the power transmitting component 70 will now be discussed in detail. FIG. 2 shows the power transmitting component 70 in an unactuated state. FIG. 3 shows the power transmitting component 70 in an intermediate state. FIG. 4 shows the power transmitting component 70 in an actuated state. When in the unactuated state, the first and second pistons 242, 246 are retracted relative to the second end 262 of the actuator housing 238, and the ram piston 214 is retracted relative to the first and second friction plates 150, 158, causing the second clutch 118 to be disengaged as discussed above. In the unactuated state, the first and second chambers 266, 270 can be unpressurized, allowing flow of fluid between the reservoir 130 and the first chamber 266. The extension member 338 of the first piston 242 is also engaged with the radial member 382 to prevent the radial member 382 from moving axially in the radial passage 302 further toward the driven end 294 of the second piston 246. In this way, the extension member 338 prevents the plug 390 from sealing the axial bore 306, and thus fluid can flow between the first and second chambers 266, 270.

A current can be applied to the motor 406 to rotationally drive the lead screw 394 in a first rotational direction. Rotation of the lead screw 394 in the first rotational direction can cause the threaded body 398 and the second piston 246 to translate axially toward the second end 262 of the actuator housing 238. As the threaded body 398 moves axially toward the second end 262, the resilient member 402 can also be translated axially. The axial translation of the resilient member 402 causes the second end 430 of the resilient member 402 to push on the driven side 354 of the first piston 242, and axially translate the first piston 242 in the first chamber 266 toward the second end 262 of the actuator housing 238. The translation of the first piston 242 in the first chamber 266 can cause the pressure of the fluid in the first chamber to rise, which can close the valve 210 to prevent fluid from flowing through the second port 278 to the reservoir 130. The first piston 242 can displace fluid in the first chamber 266, causing the fluid to flow generally from the first chamber 266, through the radial passage 302, axial bore 306, and second chamber 270, through the first port 274, and into the ram chamber 226. As the first and second pistons 242, 246 move toward the second end 262, and into the positions shown in FIG. 3, with respect to the intermediate state, the extension member 338 can continue to engage the radial member 382 to prevent the plug 390 from blocking the axial bore 306. Because the first piston 242 has a greater displacement than the second piston 246, a relatively large volume of fluid, at a relatively low pressure, can flow from the first and second chambers 266, 270 into the ram chamber 226 to move the ram piston 214 a large distance quickly. This can cause the distance between the first and second friction plates 150, 158 to be taken up quickly, as discussed above.

Once the first and second friction plates 150, 158 begin to engage, the pressure of the fluid in the first and second chambers 266, 270 increases. If the lead screw 394 continues to rotate in the first rotational direction, the threaded body 398 and second piston 246 can continue to move axially toward the second end 262. At this point, the pressure in the first chamber 266 can begin to overcome the spring force of the resilient member 402 and compress the resilient member 402 between the first piston 242 and the shoulder 422. As the resilient member 402 compresses, the first piston 242 no longer translates axially at the same rate as the second piston 246. The pressure in the first chamber 266 can reach a pressure such that the first piston 242 can cease axial translation toward the second end 262, while the resilient member 402 compresses. As the second piston 246 continues to move further toward the second end 262 relative to the first piston 242, the extension member 338 becomes further from the compression end 298 of the second piston 246 and can no longer engage the radial member 382 to prevent the plug 390 from sealing the axial bore 306. At this point, the pressure in the second chamber 270 can force the plug 390 to seal on the seating surface 314 and block fluid from flowing from the second chamber 270 back toward the first chamber 266. In this way, the valve body 250 and second piston 246 can act as a check valve. The lead screw 394 can be rotated further to move the second piston 246 further toward the second end 262. With the axial bore 306 sealed, advancement of the relatively smaller displacement second piston 246 can further compress the fluid in the second chamber 270 to deliver fluid to the ram chamber 226 at a low volume, and high pressure. This low volume, high pressure fluid can move the ram piston 214 to a fully extended position within the ram chamber 226, as shown in FIG. 4 with regard to the actuated state, to cause the first and second friction plates 150, 158 to fully engage. The valve body 250 can thus allow current to the motor 406 to be shut off while maintaining pressure within the ram chamber 226. In this way, the second clutch 118 can remain engaged without continuous application of power to the motor 406.

The motor 406 can be reversed, or the gearbox 410 can be configured to have a reverse gear (not shown), in order to drive the output member 434 in a second rotational direction, opposite the first rotational direction. Driving the output member 434 in the reverse rotational direction can rotate the lead screw 394 in the reverse rotational direction to translate the threaded body 398 axially toward the first end 258 to reverse the process described above and disengage the second clutch 118.

Those skilled in the art will appreciate that while the power transmitting component 70 is described with regard to a rear axle assembly 42, the power transmitting component 70 can be adapted for selectively transmitting power between other vehicle driveline components, such as a front axle assembly, or between a transmission and powertrain for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An actuator assembly comprising:
   a first piston and a first cylinder, the first piston being received in the first cylinder, the first piston and the first cylinder defining a first chamber, the first cylinder defining an inlet in fluid communication with the first chamber;
   a second piston and a second cylinder, the second piston being received in the second cylinder, the second piston and the second cylinder defining a second chamber, the second cylinder defining an outlet in fluid communication with the second chamber, the second piston defining a fluid passage configured to permit fluid communication between the first and second chambers;
   a valve body being movable between a first valve position wherein the fluid passage is open to permit fluid communication between the first and second chambers, and a second valve position wherein the valve body blocks the fluid passage to prevent fluid communication between the first and second chambers; and
   a linear actuator configured to axially translate the second piston, and configured to axially translate the first piston when a pressure in the first chamber is less than a predetermined pressure and not translate the first piston when the pressure in the first chamber is equal to, or greater than, the predetermined pressure;
   wherein the valve body is prevented from moving to the second valve position and the first piston provides a first volume of fluid at a first pressure to the outlet when the linear actuator translates the first piston in a first axial direction;
   wherein the valve body is permitted to move to the second valve position when the pressure in the first chamber is equal to, or greater than the predetermined pressure and the second piston is translated in the first axial direction;
   wherein the second piston provides a second volume of fluid at a second pressure to the outlet, the first volume of fluid being greater than the second volume of fluid, and the first pressure being less than the second pressure, when the valve body is in the second valve position and the second piston is translated in the first axial direction.

2. The actuator assembly of claim 1, wherein the linear actuator includes a lead screw being rotatable about an axis and having a plurality of threads, wherein the second piston has a plurality of mating threads, the threads and mating threads being configured to cooperate to axially translate the second piston when the lead screw is rotated about the axis.

3. The actuator assembly of claim 2, wherein the linear actuator includes a resilient member, the resilient member having a first end coupled for axial translation with the second piston, and a second end coupled for axial translation with the first piston, and wherein the resilient member is configured to translate the first piston when the pressure in the first chamber is less than the predetermined pressure and the second piston is axially translated, and is configured to compress between the first and second pistons to permit relative axial motion between the first and second pistons when the pressure in the first chamber is equal to, or greater than, the predetermined pressure and the second piston is translated in the first axial direction.

4. The actuator assembly of claim 1, wherein the first piston is configured to engage the valve body to prevent the valve body from moving to the second valve position when the first piston is in a first position relative to the second piston, and the valve body is permitted to move to the second valve position when the first piston is in a second position relative to the second piston.

5. The actuator assembly of claim 4, wherein the valve body includes a sealing member and a control member, the sealing member being configured to mate with a first side of the second piston proximate to the second chamber to seal the fluid passage, the control member extending from the sealing member, through the fluid passage, to a second side of the second piston proximate to the first chamber, the control member being configured to engage the first piston proximate to the second side of the second piston.

6. The actuator assembly of claim 1, wherein the first piston is an annular shape defining a central bore and the second piston extends through the central bore.

7. The actuator assembly of claim 1, wherein the inlet is coupled to a reservoir to permit fluid communication between the first chamber and the fluid reservoir.

8. An actuator assembly comprising:
a housing including a first cylinder and a second cylinder disposed about an axis, the housing defining an inlet and an outlet;
a first piston received in the first cylinder, the first piston and first cylinder defining a first fluid chamber in fluid communication with the inlet;
a second piston received in the second cylinder, the second piston and second cylinder defining a second fluid chamber in fluid communication with the outlet; and
a resilient member having a first end coupled for axial translation with the second piston, and a second end coupled for axial translation with the first piston;
wherein the resilient member is configured to translate the first piston to provide a first volume of fluid at a first pressure from the first chamber to the outlet when a pressure in the first chamber is less than a predetermined pressure and the second piston is translated in the second cylinder in a first axial direction, and wherein the resilient member is configured to compress between the first and second pistons to permit relative axial motion between the first and second pistons when the pressure in the first chamber is equal to, or greater than, the predetermined pressure and the second piston is translated in the first axial direction;
wherein the second piston provides a second volume of fluid at a second pressure from the second chamber to the outlet when the pressure in the first chamber is equal to, or greater than, the predetermined pressure and the second piston is translated in the first axial direction, the first volume of fluid being greater than the second volume of fluid, and the first pressure being less than the second pressure.

9. The actuator assembly of claim 8, further comprising a lead screw being rotatable about the axis, and having a plurality of threads, wherein the second piston has a plurality of mating threads, the threads and mating threads being configured to cooperate to axially translate the second piston when the lead screw is rotated about the axis.

10. The actuator assembly of claim 8, further comprising a valve, the valve having a fluid passage and a valve body, the fluid passage fluidly coupling the first and second chambers, the valve body being movable between a first valve position relative to the fluid passage wherein the fluid passage is open to permit fluid communication between the first and second chambers, and a second valve position relative to the fluid passage wherein the valve body seals the valve passage to prevent fluid communication between the first and second chambers.

11. The actuator assembly of claim 10, wherein the fluid passage is formed in the second piston.

12. The actuator assembly of claim 10, wherein the first piston is configured to engage the valve body to prevent the valve body from moving to the second valve position when the first piston is in a first position relative to the second piston, and the valve body is permitted to move to the second valve position when the first piston is in a second position relative to the second piston.

13. The actuator assembly of claim 12, wherein the valve body includes a sealing member, and a control member, the sealing member being configured to mate with a first side of the second piston proximate to the second chamber to seal the fluid passage, the control member extending from the sealing member, through the fluid passage, to a second side of the second piston proximate to the first chamber, the control member being configured to engage the first piston proximate to the second side of the second piston.

14. The actuator assembly of claim 8, wherein the first piston is an annular shape defining a central bore and the second piston is received through the central bore.

15. An actuator assembly comprising:
a housing including a first cylinder disposed about an axis and a second cylinder coaxial with the first cylinder, the housing defining an inlet and an outlet;
a first piston received in the first cylinder, the first piston and first cylinder defining a first fluid chamber in fluid communication with the inlet;
a second piston received in the second cylinder, the second piston and second cylinder defining a second fluid chamber in fluid communication with the outlet;
a spring having a first end coupled for axial translation with the second piston, and a second end coupled for axial translation with the first piston; and
a valve having a fluid passage and a valve body, the fluid passage fluidly coupling the first and second chambers, the valve body being movable relative to the fluid passage between a first valve position wherein the fluid passage is open to permit fluid communication between the first and second chambers, and a second valve position wherein the valve body blocks the valve passage to prevent fluid communication between the first and second chambers;
wherein the spring is configured to axially translate the first piston in a first axial direction when the second piston is translated in the first axial direction and a pressure in the first chamber is less than a predetermined pressure, and the spring is configured to compress between the first and second pistons to allow relative axial movement of the first and second pistons between a first relative position and a second relative position when the second piston is translated in the first axial direction and the pressure in the first chamber is equal to, or greater than, the predetermined pressure;
wherein the first piston is configured to engage the valve body to prevent the valve body from moving to the second valve position when the first and second pistons are in the first relative position, and the valve body is permitted to move to the second valve position when the first and second pistons are in the second relative position.

16. The actuator assembly of claim 15, wherein a pressure in the second chamber holds the valve body in the second valve position when the first and second pistons are in the second relative position.

17. The actuator assembly of claim 15, wherein the first piston is configured to provide a first volume of fluid at a first pressure through the fluid passage and to the outlet when the first piston is translated in the first axial direction, and the second piston is configured to provide a second volume of fluid at a second pressure to the outlet when the valve body is in the second valve position and the second piston is translated in the first axial direction.

18. The actuator assembly of claim 15, further comprising a lead screw being rotatable about the axis, and having a plurality of threads, wherein the second piston has a plurality of mating threads, the threads and mating threads being configured to cooperate to axially translate the second piston when the lead screw is rotated about the axis.

19. The actuator assembly of claim 15, wherein the fluid passage is formed in the second piston.

20. The actuator assembly of claim 15, wherein the first piston is an annular shape defining a central bore and the second piston extends through the central bore.

\* \* \* \* \*